United States Patent
Xu et al.

(10) Patent No.: US 12,032,579 B2
(45) Date of Patent: Jul. 9, 2024

(54) METHOD, ELECTRONIC DEVICE AND COMPUTER PROGRAM PRODUCT FOR SAMPLE SELECTION

(71) Applicant: EMC IP Holding Company LLC, Hopkinton, MA (US)

(72) Inventors: Maoyang Xu, JiangSu (CN); Qiang Ma, Chengdu (CN); Sheng Zhang, Chengdu (CN); Peng Chen, Chengdu (CN); Hua Wang, Chengdu (CN); Rui Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/655,404

(22) Filed: Oct. 17, 2019

(65) Prior Publication Data
US 2020/0133954 A1    Apr. 30, 2020

(30) Foreign Application Priority Data
Oct. 31, 2018    (CN) .......................... 201811286678.5

(51) Int. Cl.
*G06F 16/2455* (2019.01)
*G06F 16/2453* (2019.01)
(Continued)

(52) U.S. Cl.
CPC .. *G06F 16/24568* (2019.01); *G06F 16/24542* (2019.01); *G06F 16/24578* (2019.01);
(Continued)

(58) Field of Classification Search
CPC ......... G06F 16/24568; G06F 16/24542; G06F 16/9535; G06F 16/9536; G06F 16/1734;
(Continued)

(56) References Cited

U.S. PATENT DOCUMENTS

| 8,386,471 | B2 * | 2/2013 | Collins ............... G06F 16/2428 707/716 |
| 8,488,943 | B1 | 7/2013 | Sharifi |

(Continued)

FOREIGN PATENT DOCUMENTS

CN    104216887    12/2014

OTHER PUBLICATIONS

Sye-Min Chan, Ling Xiao, J. Gerth and P. Hanrahan, "Maintaining interactivity while exploring massive time series," 2008 IEEE pp. 59-66 (Year: 2008).*

(Continued)

*Primary Examiner* — Stephen S Hong
*Assistant Examiner* — Nicholas Hasty
(74) *Attorney, Agent, or Firm* — BainwoodHuang

(57) ABSTRACT

Techniques perform sample selection. Such techniques involve: in response to receiving a query time range for samples input by a user, obtaining a plurality of groups of samples from a sample set, each group of samples being collected within a corresponding time range. Such techniques further involve: determining a relationship between the query time range and time ranges corresponding to the plurality of groups of samples. Such techniques further involve: determining, based on the determined relation and from the plurality of groups of samples, a group of samples with a corresponding time range matching the query time range. Accordingly, these sets of samples may be presented accurately and efficiently to the user in a selective manner.

17 Claims, 5 Drawing Sheets

(51) Int. Cl.
  *G06F 16/2457* (2019.01)
  *G06F 16/248* (2019.01)
  *G06F 16/951* (2019.01)
  *G06F 16/9535* (2019.01)
  *G06F 16/9536* (2019.01)

(52) U.S. Cl.
  CPC .......... *G06F 16/248* (2019.01); *G06F 16/951* (2019.01); *G06F 16/9535* (2019.01); *G06F 16/9536* (2019.01)

(58) Field of Classification Search
  CPC . G06F 16/24578; G06F 16/248; G06F 16/951
  USPC ........................................................ 715/200
  See application file for complete search history.

(56) References Cited

U.S. PATENT DOCUMENTS

| | | |
|---|---|---|
| 8,949,483 B1 | 2/2015 | Martin |
| 9,626,116 B1 | 4/2017 | Martin et al. |
| 9,703,664 B1 | 7/2017 | Alshawabkeh et al. |
| 9,940,033 B1 | 4/2018 | Alshawabkeh et al. |
| 9,946,465 B1 | 4/2018 | Martin et al. |
| 9,965,218 B1 | 5/2018 | Martin et al. |
| 10,078,569 B1 | 9/2018 | Alshawabkeh et al. |
| 10,254,970 B1 | 4/2019 | Martin et al. |
| 10,261,717 B1 | 4/2019 | Martin et al. |
| 10,268,526 B1 | 4/2019 | Martin |
| 10,282,107 B1 | 5/2019 | Martin et al. |
| 10,503,535 B1 | 12/2019 | Hickey et al. |
| 10,505,857 B1 | 12/2019 | Bandlamudi et al. |
| 2003/0035525 A1 | 2/2003 | Wu et al. |
| 2003/0135525 A1 | 7/2003 | Huntington et al. |
| 2014/0324862 A1* | 10/2014 | Bingham .............. G06F 11/323 707/736 |
| 2015/0254152 A1 | 9/2015 | Gabay et al. |
| 2018/0373756 A1* | 12/2018 | Madala ............... G06F 16/2477 |

OTHER PUBLICATIONS

J. Paris, J. S. Donnal and S. B. Leeb, "NilmDB: The Non-Intrusive Load Monitor Database," in IEEE Transactions on Smart Grid, vol. 5, No. 5, pp. 2459-2467, Sep. 2014, doi: 10.1109/TSG.2014.2321582. (Year: 2014).*

Xi Zhang, T. Kurc, J. Saltz and S. Parthasarathy, "Design and analysis of a multi-dimensional data sampling service for large scale data analysis applications," Proceedings 20th IEEE International Parallel & Distributed Processing Symposium, 2006, pp. 9 pp.-, doi: 10.1109/IPDPS.2006.1639315. (Year: 2006).*

Zhang, Xi; et al., "Design and Analysis of a Multi-dimensional Data Sampling Service for Large Scale Data Analysis Applications", (Proceedings 20th IEEE International Parallel & Distributed Processing Symposium, 2006), 9 pages.

* cited by examiner

METHOD, ELECTRONIC DEVICE AND COMPUTER PROGRAM PRODUCT FOR SAMPLE SELECTION

CROSS-REFERENCE TO RELATED APPLICATION

This application claims priority to Chinese Patent Application No. CN201811286678.5, on file at the China National Intellectual Property Administration (CNIPA), having a filing date of Oct. 31, 2018, and having "METHOD, ELECTRONIC DEVICE AND COMPUTER PROGRAM PRODUCT FOR SAMPLE SELECTION" as a title, the contents and teachings of which are herein incorporated by reference in their entirety.

FIELD

The present disclosure generally relates to the field of computer, and more specifically, to a method, electronic device and computer program product for sample selection.

BACKGROUND

In an application for sampling a system performance, data is typically sampled at a fixed time interval. A set of samples of this type can represent performance indicators of a monitored system over a past period of time, which can be often displayed in a timeline chart to enable a user to review the time-varying storage system performance.

It would be appreciated that the space for storing samples is limited. Therefore, when the space for storing samples is insufficient, a new sample obtained through sampling will overwrite the sample stored earliest in the space. It can be seen that a set of stored samples can only represent performance indicators over a past period of time. Moreover, in a case that the space for storing samples is constant, the shorter the sampling interval is, the smaller the time range of samples will be. Currently, multiple sets of samples are stored typically based on different sampling intervals. However, there still lacks an accurate, efficient mechanism for selectively displaying these sets of samples to users.

SUMMARY

The embodiments of the present disclosure provide a method, device and corresponding computer program product for sample selection.

In a first aspect of the present disclosure, there is provided a method for sample selection. The method can include: in response to receiving a query time range for samples input by a user, obtaining a plurality of groups of samples from a sample set, each group of samples being collected within a corresponding time range. The method can also include: determining a relationship between the query time range and a plurality of time ranges corresponding to the plurality of groups of samples. The method can further include: determining, based on the determined relationship and from the plurality of groups of samples, a group of samples with a corresponding time range matching the query time range.

In some embodiments, determining the group of samples includes: determining at least one group of samples from the plurality of groups of samples, a time range corresponding to the at least one group of samples covering the query time range; calculating, in each group of the at least one group of samples, the number of samples within the query time range; and determining the group of samples from the at least one group of samples, the number of samples within the query time range in the determined group of samples being closest to a preset number.

In some embodiments, determining the group of samples includes: determining at least one group of samples from the plurality of groups of samples, time ranges corresponding to the at least one group of samples partially overlapping the query time range; calculating, in each group of the at least one group of samples, a ratio of a first time range partially overlapping the query time range to the query time range; and determining the group of samples from the at least one group of samples, the ratio corresponding to the determined group of samples exceeding a predetermined threshold.

In some embodiments, the method can further include: providing the user with at least one of the following: the group of samples; a sampling interval of the group of samples; and a time range of the group of samples.

In some embodiments, determining the relationship between the query time range and the plurality of time ranges corresponding to the plurality of groups of samples includes: comparing the query time range with each of the plurality of time ranges according to at least one of the following groups of information: a start time and a length; and a start time and an end time.

In a second aspect of the present disclosure, there is provided an electronic device. The device can include: at least one processing unit; and at least one memory, which is coupled to the at least one processing unit and stores machine executable instructions, the instructions, when executed by the at least one processing unit, causing the electronic device to perform acts, including: in response to receiving a query time range for samples input by a user, obtaining a plurality of groups of samples from a sample set, each group of samples being collected within a corresponding time range; determining a relationship between the query time range and a plurality of time ranges corresponding to the plurality of groups of samples; and determining, based on the determined relationship and from the plurality of groups of samples, a group of samples with a corresponding time range matching the query time range.

In a third aspect of the present disclosure, there is provided a computer program product. The computer program product is tangibly stored on a non-transient computer readable medium and includes a machine executable instruction, and the machine executable instruction, when executed, causes a machine to execute the steps of the method according to the first aspect.

This Summary is provided to introduce a selection of concepts that are further described below in the Detailed Description in a simplified form. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent, through the following detailed description of the example embodiments of the present disclosure with reference to the accompanying drawings, in which the same reference symbols generally refer to the same elements.

DETAILED DESCRIPTION OF EMBODIMENTS

Figure 1:
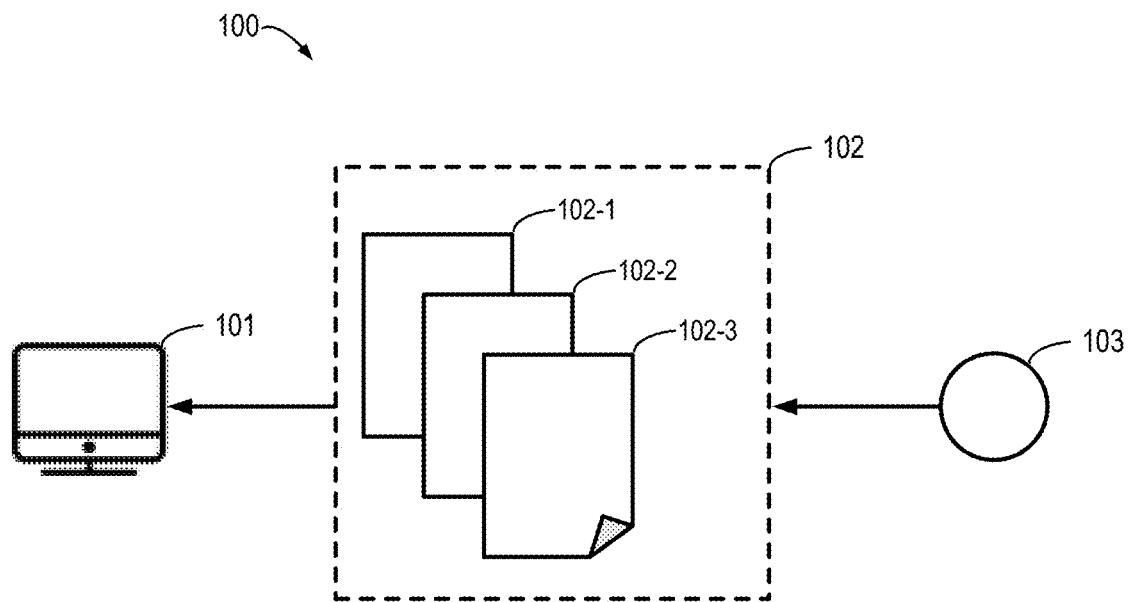
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in detail with reference to the accompanying drawings. Although the drawings illustrate preferred embodiments of the present disclosure, it would be appreciated that the present disclosure may be implemented in various forms but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "comprise" and its variants are to be read as open-ended terms that mean "comprise, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

In order to offer an aid to check the performance and condition of a system (for example, a storage system, processor and the like), a management system typically collects statistical information related to the performance and the condition. Generally, various performance indicators are defined to detect the whole performance or some aspects of the performance. Taking a storage system as an example, a system IOPS indicates the number of I/Os that a system can process within a second. In addition, the drive performance can be detected by detecting a drive bandwidth. These performance indicators are stored in a particular device, for example, a Postgres metric standard database, in the form of data. The database is located in a system pool LUN with a limited space.

It should be noted that, when the type of data is being sampled, it is impossible to reflect accurately the performance of the system if the sampling interval is set large, and the space storing samples (a LUN space) will be consumed quickly if the sampling interval is set small. Therefore, when there is an insufficient space for storing samples, a new sample obtained through sampling will overwrite the sample stored earliest in the space. It can be seen that a set of stored samples can only represent performance indicators over a past period of time. In order to solve the problem, samples obtained through sampling in a small sampling interval (for example, 1 minute) are rolled up into those with a large sampling interval (for example, 5 minutes, 1 hour or 4 hours). Samples based on a large sampling interval consume less space and can be preserved for a long time. For example, samples can be preserved for several weeks when the sampling interval is 5 minutes, while samples can be preserved for months if the sampling interval is 4 hours. Utilizing a rollup mechanism, a user may review samples sampled in a large sampling interval within a large time range.

However, there is currently no accurate and efficient mechanism for selectively presenting these sets samples to users based on a time range input by a user. As an example, when a time range input by a user does not fall within the time ranges corresponding to a plurality of sample intervals, the conventional data presenting mechanism will present a set of samples with the largest time range (the maximum sampling interval) to users. However, in case of a small time range input by a user, the data presenting mechanism may only present a few samples to the user and cannot reflect a change tendency of the system performance. Furthermore, when a time range input by a user falls within the time ranges corresponding to a plurality of sampling intervals, the conventional data presenting mechanism will present the user a set of most accurate samples (with a minimum sampling interval). However, since the samples may have too many problems, it may prolong the waiting time and impact the user experience. In addition, users may make a wrong decision or ignore a potential performance problem based on inappropriate sampling.

In order to at least partly solve the above and other potential problems and deficiencies, embodiments of the present disclosure provide a sample supplying solution, which can provide samples desired by a user for a user input, thereby improving user experience. Basic ideas of the present disclosure will be discussed below with reference to FIG. 1.

FIG. 1 illustrates a schematic diagram of an example environment 100 in which a plurality of embodiments of the present disclosure can be implemented.

As shown in FIG. 1, the example environment 100 includes a sample presenting device 101, a sample storage device 102, and a monitored device 103. In some embodiments, the sample presenting device 101 may be a computer, and the monitored device 103 may be a storage system. In addition, the sample storage device 102 stores a plurality of samples. Typically, these samples may be divided into a plurality of groups based on different sampling intervals, for example, a sample group 102-1, a sample group 102-2, and a sample group 102-3. It would be appreciated that, although the embodiment including three sample sets is shown, the embodiment does not intend to limit the scope described herein, and the present disclosure may cover the cases of more or fewer sample groups.

Moreover, each sample group includes a determined sampling interval. As an example, the sample group 102-1 may have the maximum sampling interval (for example, 1 hour), the sample group 102-2 may have an intermediate sampling interval (for example, 5 minutes), and the sample group 102-3 may have the minimum sampling interval (for example, 1 minute). Correspondingly, since the time range of the group of samples is narrowed as the sampling interval becomes smaller, the sample group 102-1 may have the largest time range (for example, 1 year), the sample group 102-2 may have the intermediate time range (for example, 4 weeks), and the sample group 102-2 may have the minimum time range (for example, 1 week). It would be appreciated that the sample storage device 102 may store samples based on other sampling intervals, for example, a sampling interval of 4 hours.

In view of the above problem, the embodiments of the present disclosure improve the solution for sample selection in the following aspects: determining relationship between a query time range input by a user and time ranges of the sample group 102-1, the sample group 102-2, and the sample group 102-3, and determining, from these groups of samples, a group of samples with the corresponding time range matching the query time range, based on the determined relations. By implementing the above solutions, the set of these samples may be selectively and accurately displayed to the user, thereby improving the user experience.

Figure 2:
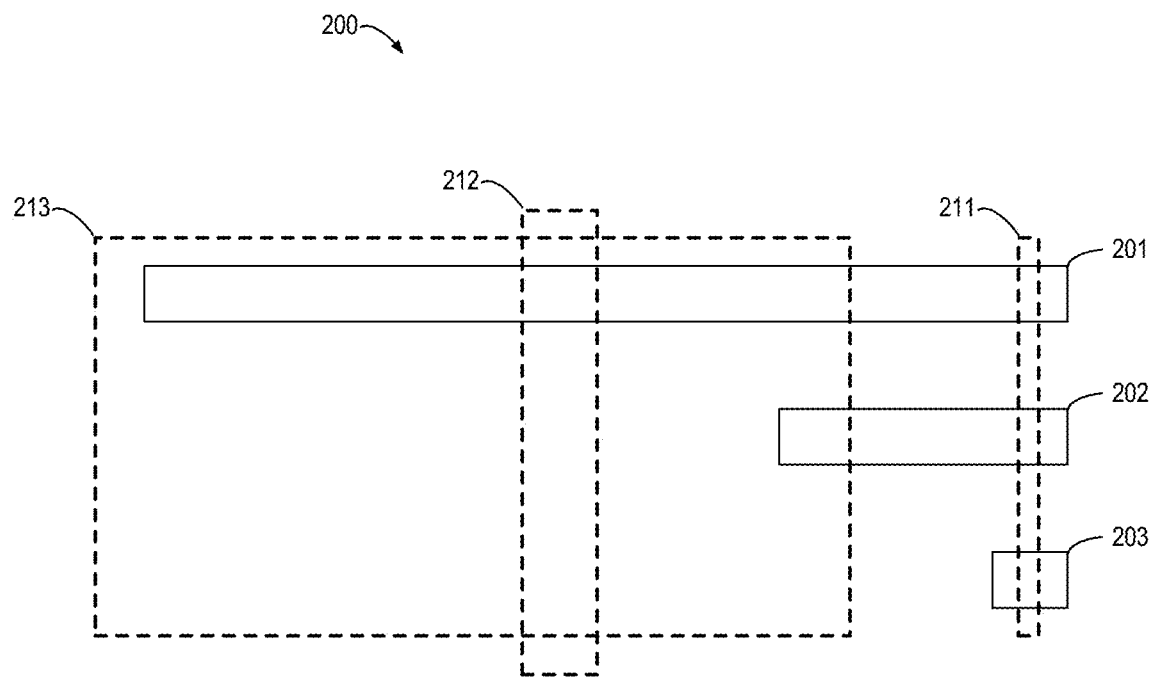
FIG. 2 illustrates a schematic diagram of a relationship between a query time range and time ranges corresponding to a plurality of groups of samples according to embodiments of the present disclosure.

FIG. 2 illustrates a schematic diagram of relationship 200 between query time ranges 211, 212, and 213 and time ranges 201, 202, and 203 corresponding to the plurality of groups of samples 102-1, 102-2, and 102-3, according to embodiments of the present disclosure. As shown in FIG. 2, the sample group 102-2 may have the maximum time range 201 (for example, 1 year); the sample group 102-2 may have the intermediate time range 202 (for example, 4 weeks); and the sample group 102-3 may have the minimum time range 203 (for example, 1 week). It would be appreciated that there may be groups of samples with other time ranges, and for example, when a sampling interval is small enough, there can be a group of samples with a time range of one day. Moreover, the query time ranges 211, 212, and 213 as shown in FIG. 2 are different time ranges input by users. For example, the query time range 211 indicates that the sampled data of the system performance the day before yesterday are to be queried, the query time range 212 indicates that the sampled data of the system performance of one day from seven months ago to one day from six months ago is to be queried, and the query time range 213 indicates that the sampled data of the system performance of one day from thirteen months ago to one day from three months ago is to be queried.

The solution for sample selection will be described below in detail for a plurality of groups of samples with different time ranges 201, 202, and 203 and a plurality of query time ranges 211, 212, and 213 input by users, with reference to FIGS. 3-5.

Figure 3:
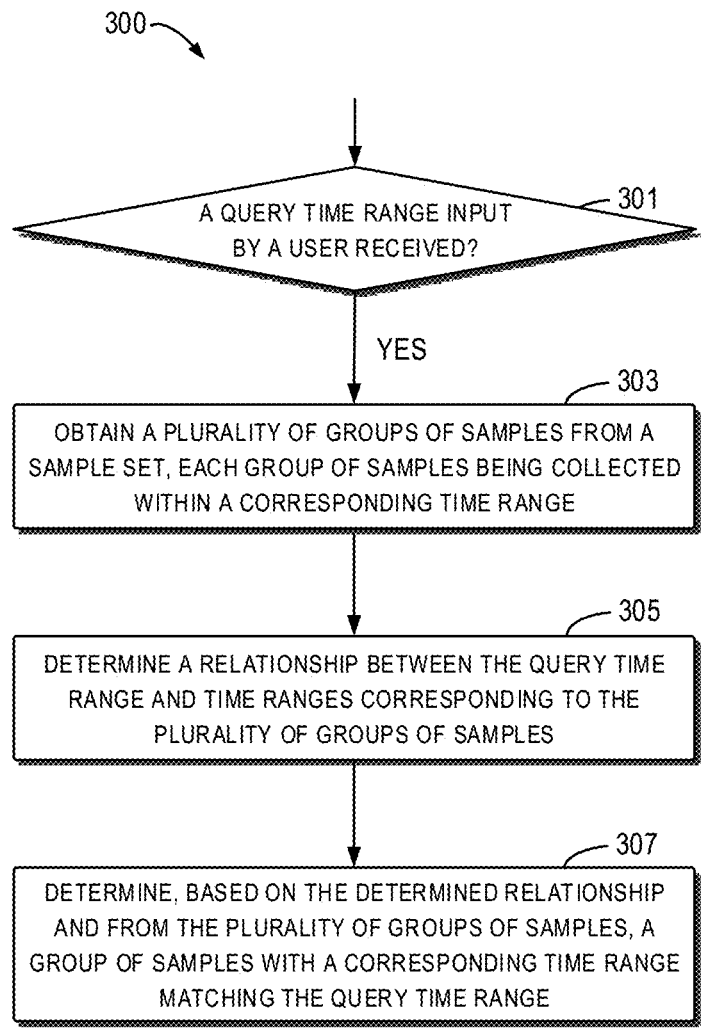
FIG. 3 illustrates a flowchart of a process or method for sample selection according to embodiments of the present disclosure.
Figure 6:
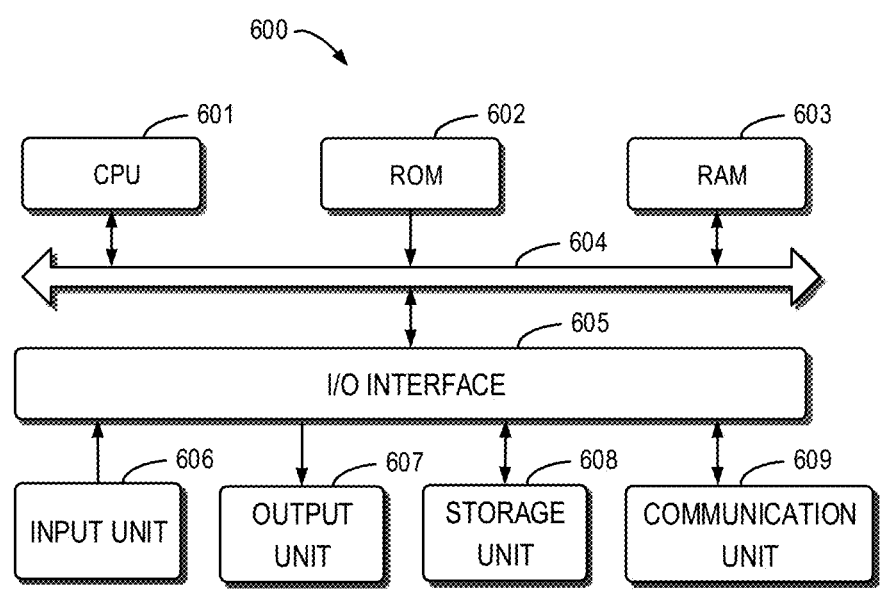
FIG. 6 illustrates a schematic block diagram of a device for sample selection according to embodiments of the present disclosure.

FIG. 3 illustrates a flowchart of a process or method 300 for sample selection according to embodiments of the present disclosure. In some embodiments, the method 300 may be implemented in a device as shown in FIG. 6. As an example, the method 300 may be implemented in the sample presenting device 101 as shown in FIG. 1. Now referring to FIG. 2, the process or method 300 of sample selection according to the embodiments of the present disclosure is described. For ease of understanding, the specific data as will be mentioned below are provided merely as an example, without limiting the protection scope of the present disclosure.

At 301, it is determined whether a query time range for samples input by a user at the sample display device 101 side is received. When the query time range is received, the method proceeds to 303.

At 303, a plurality of groups of samples 102-1, 102-2, and 10233 may be obtained from a sample set stored in the sample storage device 102. Each group of samples is collected within a corresponding time range in a particular sampling interval. In some embodiments, a plurality of groups of samples 102-1, 102-2, and 102-3 are sampled data prestored in the sample storage device 102. As an example, the plurality of groups of samples 102-1, 102-2, and 102-3 occupies different storage spaces. Alternatively or additionally, the plurality of groups of samples 102-1, 102-2, and 102-3 occupies the same storage space.

At 305, the relationship between the query time range and a plurality of time ranges 201, 202, and 203 corresponding to the plurality of groups of samples 102-1, 102-2, and 102-3 is determined. As shown in FIG. 2, the relationship between the query time range 212 and the time ranges 201, 202, and 203 corresponding to the plurality of groups of samples may be determined.

Returning to FIG. 3, at 307, a group of samples with a corresponding time range matching the query time range is determined based on the determined relationship and from the plurality of groups of samples 102-1, 102-2 and 102-3. As shown in FIG. 2, the query time range 212 only overlaps the time range 201, without overlapping the time ranges 202 and 203, which indicates that the samples in the group of samples 102-1 within the query time range 212 may be selected to be presented to the user. Therefore, the group of samples 102-1 is determined from the plurality of samples 102-1, 102-2 and 102-3.

By implementing the above process, the set of samples for describing the monitored device 102 may be presented to the user accurately and efficiently in a selective manner, thereby enabling the user to execute decision making based on accurate sample data.

In order to satisfy more users' demands, an additional or alternative solution for sample selection is proposed according to other embodiments of the present disclosure. Description thereon will be detailed below with reference to FIGS. 4 and 5.

Figure 4:
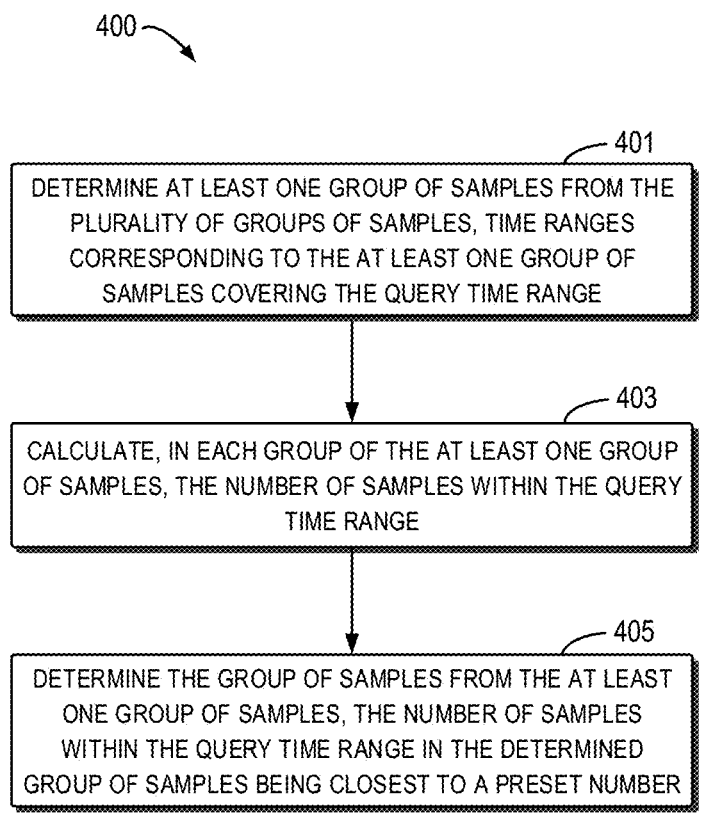
FIG. 4 illustrates a flowchart of a process or method of sample selection according to embodiments of the present disclosure.

FIG. 4 illustrates a flowchart of a process or method 400 for sample selection according to embodiments of the present disclosure. Specifically, FIG. 4 illustrates a specific process of determining a group of samples as described in FIG. 3. In some embodiments, the method 400 may be implemented in the device as shown in FIG. 6. As an example, the method 400 can be implemented in the sample display device 101 as shown in FIG. 1. Now referring to FIG. 2, the process or method 400 for sample selection is described according to embodiments of the present disclosure. For ease of understanding, the specific data as will be mentioned below are provided merely as an example, without limiting the protection scope of the present disclosure.

At 401, at least one group of samples is determined from the plurality of groups of samples 102-1, 102-2 and 102-3, and the time range corresponding to the at least one group of samples covers the query time range. As shown in FIG. 2, the query time range 211 overlaps the time range 201, the time range 202, and the time range 203, which indicates that all samples in the groups of samples 102-1, 102-2 and 102-3 within the query time range 211 are probably selected to be presented to a user. However, since only samples within a group of samples are presented to a user, it is required to further filter these groups of samples.

Back to FIG. 4, at 403, the number of samples in the at least one group of samples within the query time range is calculated. As an example, respective numbers of samples in the groups of samples 102-1, 102-2, and 102-3 within the query time range 211 may be calculated. As mentioned in the above example, the sampling intervals of the groups of samples 102-1, 102-2 and 102-3 are 1 hour, 5 minutes and 1 minute, respectively, and the time length of the query time range 211 is one day. Therefore, it may be calculated that the number in the group of samples 102-1 within the query time range 211 is 24 (1×24). Similarly, it may be calculated that the numbers in the groups of samples 102-2 and 102-3 within the query time range 211 are 288 (12×24) and 1440 (60×24), respectively.

At 405, a group of samples is determined from the at least one group of samples, in which the number of samples within the query time range is closest to a preset number. It would be appreciated that the group of samples 102-2 is selected, because the 24 samples in the group of samples 102-1 are not enough for describing the performance of the monitored device 103, while 1440 samples in the group of samples 102-3 probably increase significantly the sample calculating amount of the sample display device 101 and prolong the calculation latency. In some embodiments, the preset number of samples may be set to 180 or other numbers, and after the preset number of samples is subtracted from the numbers of the samples in the groups of samples 102-1, 102-2, and 102-3 within the query time range 211, respectively, the group of samples with a minimum absolute difference value is selected to be presented to a user.

By implementing the above process, the set of samples for describing the monitored device 103 may be presented to users selectively and accurately. In addition, since a sample data reference value is set, it may reduce the calculation latency and thus improve the user experience while ensuring that the accurate sampled data are provided to reflect the performance of the monitored device 103.

Figure 5:
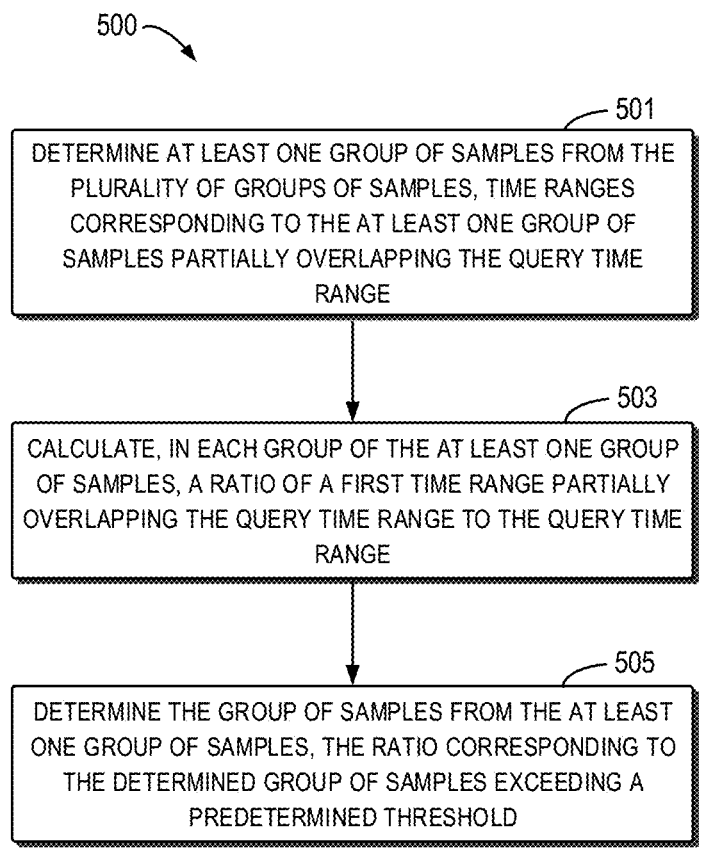
FIG. 5 illustrates a flowchart of a process or method of sample selection according to embodiments of the present disclosure.

FIG. 5 illustrates a flowchart of a process or method 500 for sample selection according to embodiments of the present disclosure. Specifically, FIG. 5 describes a further process of determining a group of samples in FIG. 3. In some embodiments, the method 500 can be implemented in a device as shown in FIG. 6. As an example, the method 500 may be implemented in the sample display device 101 as shown in FIG. 1. Now referring to FIG. 2, a process or method of selecting samples according to embodiments of the present disclosure. For ease of understanding, the specific data as will be mentioned below are provided merely as an example, without limiting the protection scope of the present disclosure.

At 501, at least one group of samples is determined from a plurality of groups of samples 102-1, 102-2 and 102-3, and the time range corresponding to the at least one group of samples partially overlaps the query time range. As shown in FIG. 2, the query time range 213 partially overlaps both of the time range 201 and the time range 202, indicating that the samples in both groups of samples 102-1 and 102-2 within the query time range 213 are probably selected to be presented to a user. However, since only samples within a group of samples are presented to a user, it is required to further filter these groups of samples.

Back to FIG. 5, at 503, a ratio of a first time range of the at least one group of samples, which partially overlaps the query time range, to the query time range is calculated. As an example, the ratios of the time ranges of the group of samples 102-1 and 102-2, which partially overlaps the query time range 213, to the query time range 213 may be calculated, respectively. As shown in FIG. 2, the overlapping ratio of the group of samples 102-1 is about 90%, and the overlapping ratio of the group of samples 102-2 is about 10%.

At 505, a group of samples is determined from the at least one group of samples, and the ratio corresponding to the determined group of samples exceeds a predetermined threshold. It would be appreciated that, if the ratio of the time range of the group of samples, which partially overlaps the query time range 213, to the query time range 213 is higher, the data presented to users is more comprehensive. Therefore, the group of samples 102-1 with an overlapping ratio of 90% may be selected as samples to be presented to users. In some embodiments, the preset number of samples can be set to 75% or other numbers. Alternatively or additionally, when the query time range does not overlap the respective groups of samples 102-1, 102-2 and 102-3, the performance of the monitored device 103 is presented based on a default time range and a default group of samples, and it is reported to the user that the query time range is not applicable.

By implementing the above process, the set of samples for describing the monitored device 102 may be presented to users accurately and efficiently in a selective manner. Moreover, in the process, it is taken into account the case that a query time range input by a user is partially not within time ranges of groups of samples, thereby reducing a possibility of providing wrong samples to a user and thus improving the user experience.

In some embodiments, at least one of the following may be presented to users: a group of samples; a sampling interval of the group of samples; and a time range of the group of samples.

In some embodiments, determining a relationship between a query time range and a plurality of groups of samples may include comparing the query time range with a plurality of time ranges corresponding to a plurality of groups of samples according to at least one of the following groups of information: a start time and a length; and a start time and an end time.

FIG. 6 illustrates a schematic block diagram of an example device 600 that can be used to implement an embodiment of the present disclosure. As illustrated, the device 600 includes a central processing unit (CPU) 601 which may perform various appropriate actions and processing based on a computer program instruction stored in a read-only memory (ROM) 602 or a computer program instruction loaded from a storage unit 608 into a random access memory (RAM) 603. The RAM 603 also stores therein various programs and data required for operations of the device 600. The CPU 601, the ROM 602 and the RAM 603 are connected to each other via a bus 604, to which an input/output (I/O) interface 605 is also connected.

The following components in the device 600 are connected to the I/O interface 605: an input unit 606 such as a keyboard, a mouse and the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the methods 400, 500 and/or 600 may be executed by the processing unit 601. As an example, in some embodiments, the methods 400, 500 and/or 600 may be implemented as a computer software programs, which are tangibly included in a machine readable medium, e.g., the storage unit 608. In some embodiments, the computer program may be partially or completely loaded and/or installed to the device 600 via ROM 602 and/or communication unit 609. When the computer program is loaded to the RAM 603 and executed by the CPU 601, one or more acts of the methods 400, 500 and/or 600 as described above may be implemented.

The present disclosure may be a method, a device, a system, and/or a computer program product. The computer program product may include a computer readable storage medium loaded with computer readable program instructions thereon for causing a processor to carry out aspects of the present disclosure.

The computer readable storage medium may be a tangible device that capable of holding and storing instructions for used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for sample selection, comprising:
   receiving I/Os by a storage system;
   monitoring performance indicators of the storage system based on the received I/Os, the performance indicators including at least one of (i) IOPS (I/Os per second) received by the storage system and (2) drive performance;
   storing the performance indicators in a plurality of sample sets, each of the plurality of sample sets having a respective sample rate and covering a respective sample interval;
   in response to receiving a query time range for samples input by a user, obtaining a plurality of groups of samples from respective sample sets of the plurality of sample sets, wherein each group of samples in the plurality of groups is collected within a corresponding time range, covers a different time range, and has a different, regular sample interval;
   determining a plurality of relationships between the query time range and a plurality of time ranges corresponding to the plurality of groups, wherein time ranges of multiple groups of samples intersect the query time range;
   determining, based on the determined plurality of relationships and from the plurality of groups, a group of samples with a corresponding time range matching the query time range; and
   displaying, by a sample display device, the group of samples to the user as a timeline chart, thereby enabling the user to execute decision making based on accurate sample data,
   wherein determining the group of samples includes:
      identifying, from the plurality of groups, a set of groups of samples that include respective time ranges that cover the query time range; and
      determining, from the set of groups, the group of samples as a group having a respective number of samples within the query time range that is closest to a preset number, at least in part by calculating, for each group in the set of groups, a difference between the preset number and each respective number of samples within the query time range,
      wherein the group of samples that is determined and displayed includes fewer samples than another group of samples in the set of groups, the method thereby reducing calculation latency that would be incurred by determining and displaying the other group of samples.

2. The method according to claim 1, wherein determining the group of samples comprises:
   determining at least one group of samples from the plurality of groups of samples, time ranges corresponding to the at least one group of samples partially overlapping the query time range;
   calculating, in each group of the at least one group of samples, a ratio of a first time range partially overlapping the query time range to the query time range; and
   determining the group of samples from the at least one group of samples, the ratio corresponding to the determined group of samples exceeding a predetermined threshold.

3. The method according to claim 1, further comprising providing the user with at least one of the following:
   the group of samples;
   a sampling interval of the group of samples; and
   a time range of the group of samples.

4. The method according to claim 1, wherein determining the relationship between the query time range and the plurality of time ranges corresponding to the plurality of groups of samples comprises:
   comparing the query time range with each of the plurality of time ranges according to at least one of the following groups of information:
   a start time and a length; and
   a start time and an end time.

5. An electronic device, comprising:
   at least one processing unit; and
   at least one memory, which is coupled to the at least one processing unit and stores machine executable instructions, the instructions, when executed by the at least one processing unit, causing the electronic device to perform acts, comprising:
   receiving I/Os by a storage system;
   monitoring performance indicators of the storage system based on the received I/Os, the performance indicators including at least one of (i) IOPS (I/Os per second) received by the storage system and (2) drive performance;
   storing the performance indicators in a plurality of sample sets, each of the plurality of sample sets having a respective sample rate and covering a respective sample interval;
   in response to receiving a query time range for samples input by a user, obtaining a plurality of groups of samples from respective sample sets of the plurality of sample sets, wherein each group of samples in the plurality of groups is collected within a corresponding time range, covers a different time range, has a different, regular sample interval, and is included in a respective sample set;
   determining a plurality of relationships between the query time range and a plurality of time ranges corresponding to the plurality of groups;
   determining, based on the determined plurality of relationships and from the plurality of groups, a group of samples with a corresponding time range matching the query time range; and
   displaying, by a sample display device, the group of samples to the user as a timeline chart, thereby enabling the user to execute decision making based on accurate sample data, wherein determining the group of samples includes:
identifying, from the plurality of groups, a set of multiple groups of samples that includes, for each of the multiple groups, samples collected within a respective time range partially overlapping the query time range;
determining, for each group in the set of multiple groups, a respective portion of the respective time range that is within the query time range, at least two portions having sizes that differ from each other;
calculating, for each group in the set of multiple groups, a respective ratio of the portion of the respective time range to the query time range;
determining, from the set of multiple groups, a group of samples with a ratio that exceeds a predetermined threshold,
wherein the group of samples that is determined and displayed includes fewer samples than another group of samples in the set of groups, the method thereby reducing calculation latency that would be incurred by determining and displaying the other group of samples.

6. The device according to claim 5, wherein determining the group of samples comprises:
determining at least one group of samples from the plurality of groups of samples, time ranges corresponding to the at least one group of samples covering the query time range;
calculating, in each group of the at least one group of samples, the number of samples within the query time range; and
determining the group of samples from the at least one group of samples, the number of samples within the query time range in the determined group of samples being closest to a preset number.

7. The device according to claim 5, wherein the instructions, when executed by the at least one processing unit, further cause the electronic device to:
provide the user with at least one of the following:
the group of samples;
a sampling interval of the group of samples; and
a time range of the group of samples.

8. The device according to claim 5, wherein determining the relationship between the query time range and plurality of the time ranges corresponding to the plurality of groups of samples comprises:
comparing the query time range with each of the plurality of time ranges according to at least one of the following groups of information:
a start time and a length; and
a start time and an end time.

9. A computer program product having a non-transitory computer readable medium which stores a set of instructions to perform sample selection; the set of instructions, when carried out by computerized circuitry, causing the computerized circuitry to perform a method of:
receiving I/Os by a storage system;
monitoring performance indicators of the storage system based on the received I/Os, the performance indicators including at least one of (i) IOPS (I/Os per second) received by the storage system and (2) drive performance;
storing the performance indicators in a plurality of sample sets, each of the plurality of sample sets having a respective sample rate and covering a respective sample interval;

in response to receiving a query time range for samples input by a user, obtaining a plurality of groups of samples from respective sample sets of the plurality of sample sets, wherein each group of samples in the plurality of groups is collected within a corresponding time range, covers a different time range, has a different, regular sample interval, and is included in a respective sample set;
determining a plurality of relationships between the query time range and a plurality of time ranges corresponding to the plurality of groups, wherein time ranges of multiple groups of samples intersect the query time range;
determining, based on the determined plurality of relationships and from the plurality of groups, a group of samples with a corresponding time range matching the query time range; and
displaying, by a sample display device, the group of samples to the user as a timeline chart, thereby enabling the user to execute decision making based on accurate sample data,
wherein determining a group of samples includes:
selecting a particular group of samples in the plurality of groups based on a characteristic of the samples in the particular group of samples, the characteristic being one of: (i) the particular group of samples having a number of samples within the query time range closest to a preset number and (ii) the particular group of samples having a degree of overlap with the query time range that exceeds a predetermined threshold, wherein at least two groups in the plurality of groups have different degrees of overlap,
wherein the selected particular group of samples includes fewer samples than another group of samples in the set of groups, the method thereby reducing calculation latency that would be incurred by determining and displaying the other group of samples.

10. The method according to claim 1, wherein each group of samples of the plurality of groups of samples represents system performance of a monitored device.

11. The method according to claim 10, wherein the monitored device is a storage system; and wherein obtaining the plurality of groups of samples includes:
accessing different sample groups of the plurality of groups of samples, each of the different sample groups representing a particular performance aspect of the storage system.

12. The method according to claim 10, wherein determining the group of samples with the corresponding time range matching the query time range includes:
selecting a particular sample group among a first sample group having samples separated by a first time interval and a second sample group having samples separated by a second time interval, the first time interval being longer than the second time interval.

13. A method for sample selection, comprising:
receiving I/Os by a storage system;
monitoring performance indicators of the storage system based on the received I/Os, the performance indicators including at least one of (i) IOPS (I/Os per second) received by the storage system and (2) drive performance;
storing the performance indicators in a plurality of sample sets, each of the plurality of sample sets having a respective sample rate and covering a respective sample interval;

receiving a query for samples, the query indicating a query time range;

in response to the query for samples, identifying groups of samples of the plurality of sample sets which cover different time ranges and have different, regular sample intervals; and selecting a particular group of samples from the identified groups of samples based on matching of the query time range indicated by the query for samples to the identified groups of samples which cover the different time ranges and have the different, regular sample intervals; and displaying, by a sample display device, the particular group of samples to a user as a timeline chart, thereby enabling the user to execute decision making based on accurate sample data, wherein selecting the particular group of samples comprises:

identifying, from the identified of groups of samples, a set of multiple groups of samples including each group collected within a corresponding time range that covers the query time range; and determining, from the set of groups, a group of samples having a respective number of samples within the query time range that is closest to a preset number, at least in part by calculating, for each group in the set of groups, a difference between the preset number and each respective number of samples within the query time range, wherein the group of samples that is determined and displayed includes fewer samples than another group of samples in the set of groups, the method thereby reducing calculation latency that would be incurred by determining and displaying the other group of samples.

14. The method of claim 13 wherein the query further indicates a particular performance aspect of a storage system; and wherein identifying the groups of samples which cover different time ranges and have different, regular sample intervals includes:

querying a database for the particular performance aspect, the database storing a variety of different collected performance aspects of the storage system, each group of samples of the identified groups of samples including respective measurements for a same performance aspect of the storage system that matches the particular performance aspect of the storage system, the respective measurements of the group covering a different time range and a different, regular sample time interval.

15. The method of claim 14, further comprising:

after the particular group of samples is selected from the identified groups of samples, rendering at least some measurements of the particular group of samples on a display device.

16. The device according to claim 5, wherein calculating, for each group in the set of the groups, a respective ratio of the corresponding time range partially overlapping the query time range to the query time range includes identifying, for each group in the set of groups, a respective quotient of the corresponding time range partially overlapping the query time range over the query time range.

17. The method of claim 1, further comprising storing groups of samples in sample sets based on respective sampling intervals of the groups of samples.

* * * * *